United States Patent
Nagase

(10) Patent No.: US 10,239,358 B2
(45) Date of Patent: Mar. 26, 2019

(54) PNEUMATIC TIRE

(71) Applicant: Sumitomo Rubber Industries, Ltd., Kobe-shi, Hyogo (JP)

(72) Inventor: Hiroki Nagase, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/013,676

(22) Filed: Feb. 2, 2016

(65) Prior Publication Data

US 2016/0236517 A1    Aug. 18, 2016

(30) Foreign Application Priority Data

Feb. 16, 2015    (JP) ................... 2015-027490

(51) Int. Cl.
     *B60C 11/03*      (2006.01)
     *B60C 11/12*      (2006.01)

(52) U.S. Cl.
     CPC ...... *B60C 11/0332* (2013.01); *B60C 11/0302* (2013.01); *B60C 11/0304* (2013.01); *B60C 11/0306* (2013.01); *B60C 11/1204* (2013.01); *B60C 11/125* (2013.01); *B60C 11/1236* (2013.01); *B60C 11/1272* (2013.01);
(Continued)

(58) Field of Classification Search
     CPC ......... B60C 11/1281; B60C 2011/0341; B60C 2011/0344; B60C 2011/0351; B60C 2011/0353
See application file for complete search history.

(56) References Cited

U.S. PATENT DOCUMENTS

| | | | | | |
|---|---|---|---|---|---|
| 5,616,194 A | * | 4/1997 | Lim | .................... | B60C 11/0306 |
| | | | | | 152/209.18 |
| 5,851,322 A | * | 12/1998 | Hayashi | .............. | B60C 11/0302 |
| | | | | | 152/209.2 |

(Continued)

FOREIGN PATENT DOCUMENTS

| | | | | |
|---|---|---|---|---|
| EP | 2 716 477 A1 | 4/2014 | | |
| EP | 2732982 | * 5/2014 | ............. | B60C 11/02 |

(Continued)

OTHER PUBLICATIONS

Extended European Search Report, dated Jul. 8, 2016, for European Application No. 16152658.7.

*Primary Examiner* — Jodi C Franklin
(74) *Attorney, Agent, or Firm* — Birch, Stewart, Kolasch & Birch LLP

(57) ABSTRACT

A pneumatic tire includes a tread portion provided with a first shoulder main groove, a second shoulder main groove and at least one main groove to separate a first crown portion and a second crown portion. The first crown portion is provided with first crown sipes with a width less than 2 mm, but is not provided with any grooves with a width equal to or more than 2 mm. The second crown portion is provided with second crown sipes having a width less than 2 mm, but is not provided with any grooves with a width equal to or more than 2 mm. Each first crown sipe extends from the crown main groove to the first shoulder main groove with a first inclination direction. Each second crown sipe extends from the crown main groove to the second shoulder main groove with the first inclination direction.

15 Claims, 5 Drawing Sheets

(52) U.S. Cl.
CPC ... *B60C 11/1281* (2013.01); *B60C 2011/0334* (2013.01); *B60C 2011/0341* (2013.01); *B60C 2011/0344* (2013.01); *B60C 2011/0353* (2013.01)

(56) References Cited

U.S. PATENT DOCUMENTS

| | | | | |
|---|---|---|---|---|
| 6,050,313 | A * | 4/2000 | Tsuda | B60C 11/12 152/209.18 |
| 6,378,583 | B1 * | 4/2002 | Fontaine | B60C 11/01 152/209.18 |
| D656,890 | S * | 4/2012 | Rittweger | D12/583 |
| D700,884 | S * | 3/2014 | Herbeuval | D12/584 |
| 9,186,937 | B2 * | 11/2015 | Nakata | B60C 11/0306 |
| 9,216,618 | B2 * | 12/2015 | Suga | B60C 11/1392 |
| 9,387,729 | B2 * | 7/2016 | Aoki | B60C 11/0306 |
| 2009/0255616 | A1 * | 10/2009 | Tomatsu | B29D 30/0606 152/209.21 |
| 2010/0326577 | A1 * | 12/2010 | Iwai | B60C 11/0309 152/209.24 |
| 2011/0120609 | A1 * | 5/2011 | Nakamura | B60C 11/0302 152/209.18 |
| 2011/0297284 | A1 * | 12/2011 | Montesello | B60C 11/0304 152/209.15 |
| 2012/0060987 | A1 * | 3/2012 | Nemoto | B60C 11/0306 152/209.8 |
| 2012/0318420 | A1 * | 12/2012 | Sawai | B60C 11/042 152/209.15 |
| 2013/0014871 | A1 * | 1/2013 | Georges | B60C 11/04 152/209.18 |
| 2013/0048173 | A1 * | 2/2013 | Kiwaki | B60C 11/0309 152/209.18 |
| 2013/0081744 | A1 * | 4/2013 | Kameda | B60C 11/12 152/209.5 |
| 2013/0118663 | A1 * | 5/2013 | Kishizoe | B60C 11/12 152/209.18 |
| 2013/0248068 | A1 * | 9/2013 | Nakata | B60C 11/0306 152/209.18 |
| 2015/0041034 | A1 * | 2/2015 | Matsushita | B60C 11/04 152/209.24 |
| 2015/0075686 | A1 * | 3/2015 | Suga | B60C 11/1392 152/209.16 |
| 2015/0151584 | A1 * | 6/2015 | Koishikawa | B60C 11/0306 152/209.18 |
| 2016/0152090 | A1 * | 6/2016 | Takemoto | B60C 11/0306 152/209.24 |
| 2016/0207360 | A1 * | 7/2016 | Saeki | B60C 11/11 |
| 2016/0229231 | A1 * | 8/2016 | Furusawa | B60C 11/005 |

FOREIGN PATENT DOCUMENTS

| | | | | |
|---|---|---|---|---|
| EP | 2899041 | * | 7/2015 | ............ B60C 11/12 |
| EP | 3 012 119 A1 | | 4/2016 | |
| JP | 2000-135904 A | | 5/2000 | |
| JP | 2014159287 A | * | 9/2014 | ............ B60C 11/03 |
| WO | WO 2015/002096 A1 | | 1/2015 | |

* cited by examiner

PNEUMATIC TIRE

BACKGROUND OF THE INVENTION

Field of the Invention

The present invention relates to pneumatic tires, and in particular, relates to a pneumatic tire capable of improving steering stability on wet road as well as on dry road.

Description of the Related Art

Conventionally, a pneumatic tire including a tread portion provided with a groove having an improved shape has been proposed to improve drainage performance.

For instance, Japanese Unexamined Patent Application Publication No. 2000-135904 discloses a pneumatic tire including a tread portion provided with three main grooves having a wide width and a plurality of lug grooves to offer an improved drainage performance. Unfortunately, such a tread pattern having three wide main grooves reduces tread rigidity, and therefore steering stability on dry road as well as on wet road may deteriorate.

SUMMARY OF THE INVENTION

In view of the above problems in the conventional art, the present invention has an object to provide a pneumatic tire capable of improving steering stability on wet road as well as on dry road in high level.

According to one aspect of the present invention, a pneumatic tire includes a tread portion being provided with a plurality of circumferentially and continuously extending main grooves to separate a plurality of land portions. The main grooves includes a first shoulder main grooves, a second shoulder main groove and at least one crown main groove disposed between the first shoulder main groove and a second shoulder main groove. The land portions includes a pair of shoulder portions each disposed axially outward of each first and second shoulder main groove, a first crown portion disposed between the crown main groove and the first shoulder main groove, and a second crown portion disposed between the crown main groove and the second shoulder main groove. The first crown portion is provided with a plurality of first crown sipes having a width less than 2 mm, but the first crown portion is not provided with any grooves having a width equal to or more than 2 mm. The second crown portion is provided with a plurality of second crown sipes having a width less than 2 mm, but the second crown portion is not provided with any grooves having a width equal to or more than 2 mm. Each of the first crown sipes extends from the crown main groove to the first shoulder main groove with a first inclination direction with respect to an axial direction of the tire. Each of the second crown sipes extends from the crown main groove to the second shoulder main groove with the first inclination direction with respect to an axial direction of the tire.

In another aspect of the invention, each of the first crown sipes may be smoothly continued to each of the second crown sipes through the crown main groove.

In another aspect of the invention, each of the first crown sipes and the second crown sipes may include a chamfered portion provided on its radially outer portion.

In another aspect of the invention, a total of widths of the main grooves may be in a range of from 25% to 29% of a tread width.

In another aspect of the invention, each of the first crown sipes and the second crown sipes may extend in a curve shape.

In another aspect of the invention, each of the first crown sipes may extend in an arc shape that protrudes a first circumferential direction, and each of the second crown sipes may extend in an arc shape that protrudes a second circumferential direction reverse to the first circumferential direction.

In another aspect of the invention, the tread portion may include a designated install direction to a vehicle to have an outboard tread edge and an inboard tread edge, the first shoulder main groove and the first crown portion may be disposed on the side of the outboard tread edge, the second shoulder main groove and the second crown portion may be disposed on the side of the inboard tread edge, and the first crown portion may be further provided with a third crown sipe disposed between a pair of circumferentially adjacent first crown sipes, wherein the third crown sipe may include at least one end terminating within the first crown portion.

In another aspect of the invention, the third crown sipe may include an outer third crown sipe connected to the first shoulder main groove, and an inner third crown sipe connected to the crown main groove, and the outer third crown sipe and the inner third crown sipe may be alternately arranged in a circumferential direction of the tire.

In another aspect of the invention, the third crown sipe may be inclined in the first inclination direction with respect to an axial direction of the tire.

In another aspect of the invention, each of the third crown sipes may be inclined in the first inclination direction with respect to an axial direction of the tire.

DESCRIPTION OF THE EMBODIMENTS

An embodiment of the present invention will be explained below with reference to the accompanying drawings.

Figure 1:
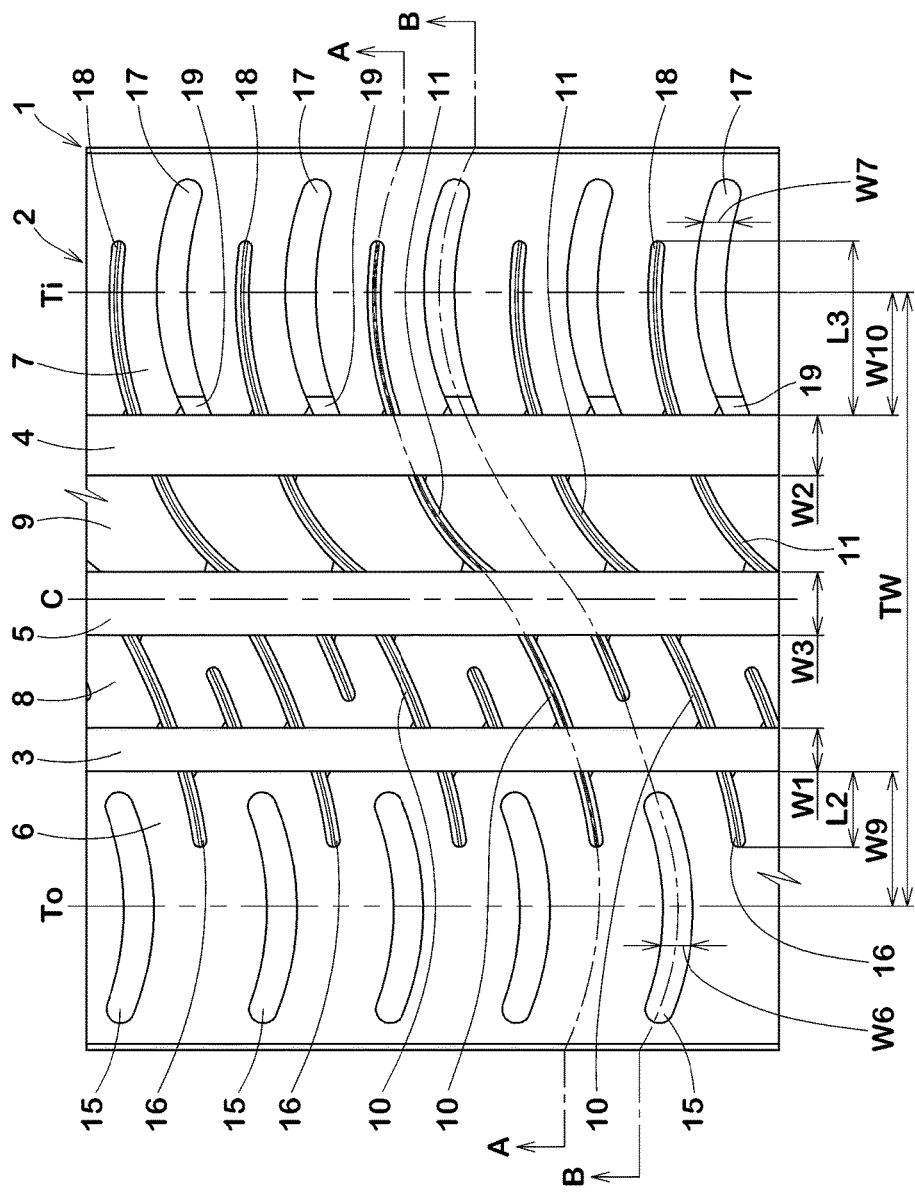
FIG. 1 is a development view of a tread portion of a pneumatic tire according to an embodiment of the present invention.

FIG. 1 illustrates a development view of a tread portion 2 of a pneumatic tire 1 according to an embodiment of the present invention. As illustrated in FIG. 1, the tread portion 2 of the pneumatic tire 1 is provided with a plurality of circumferentially and continuously extending main grooves 3, 4 and 5 to separate a plurality of land portions 6, 7, 8 and 9. In this embodiment, the tire 1 is preferably embodied as a tire for passenger vehicles which includes an asymmetrical tread pattern or design having a designated install direction to a vehicle so as to have an outboard tread edge To and an inboard tread edge Ti. The install direction may be indicated using a character or mark on a sidewall portion (not shown), for example.

In this embodiment, the main grooves includes a first shoulder main groove 3 located near the outboard tread edge To, a second shoulder main groove 4 located near the inboard tread edge Ti and a crown main groove 5 located between the first shoulder main groove 3 and the second shoulder main groove 4.

The respective first shoulder main groove 3, the second shoulder main groove 4 and the crown main groove 5 extend in a straight manner to offer an excellent drainage performance. In order to further improve the above drainage effect, a total of widths W1, W2 and W3 of the first shoulder main groove 3, the second shoulder main groove 4 and the crown main groove 5 respectively is preferably in a range of from 25% to 29% of a tread width TW.

When the total of widths W1+W2+W3 is less than 25% the tread width TW, the drainage performance may be deteriorated. When the total of widths W1+W2+W3 is more than 29% the tread width TW, steering stability may be deteriorated owing to lack of net ground contact area of the tread portion 2.

Preferably, the width W1 of the first shoulder main groove 3 is smaller than the width W2 of the second shoulder main groove 4 and the width W3 of the crown main groove 5. Preferably, the width W1 of the first shoulder main groove 3 may be in a range of from 60% to 80% the width W2 of the second shoulder main groove 4, for example. Such a first shoulder main groove 3 may ensure sufficient rigidity of the outboard tread portion where large side force is acted when cornering, and therefore steering stability on dry road may be improved.

Alternatively, the width W1 of the first shoulder main groove 3 may be set same as the width W2 of the second shoulder main groove 4. In this case, the respective shoulder main grooves 3 and 4, and the crown main groove 5 may be arranged in a symmetrical manner with respect to the tire equator C.

Preferably, the width W3 of the crown main groove 5 may be greater than the width W2 of the second shoulder main groove 4. Such a crown main groove 5 may effectively improve drainage performance on the tread portion 2 around the tire equator C where a large ground contact pressure is to be acted.

Figure 2:
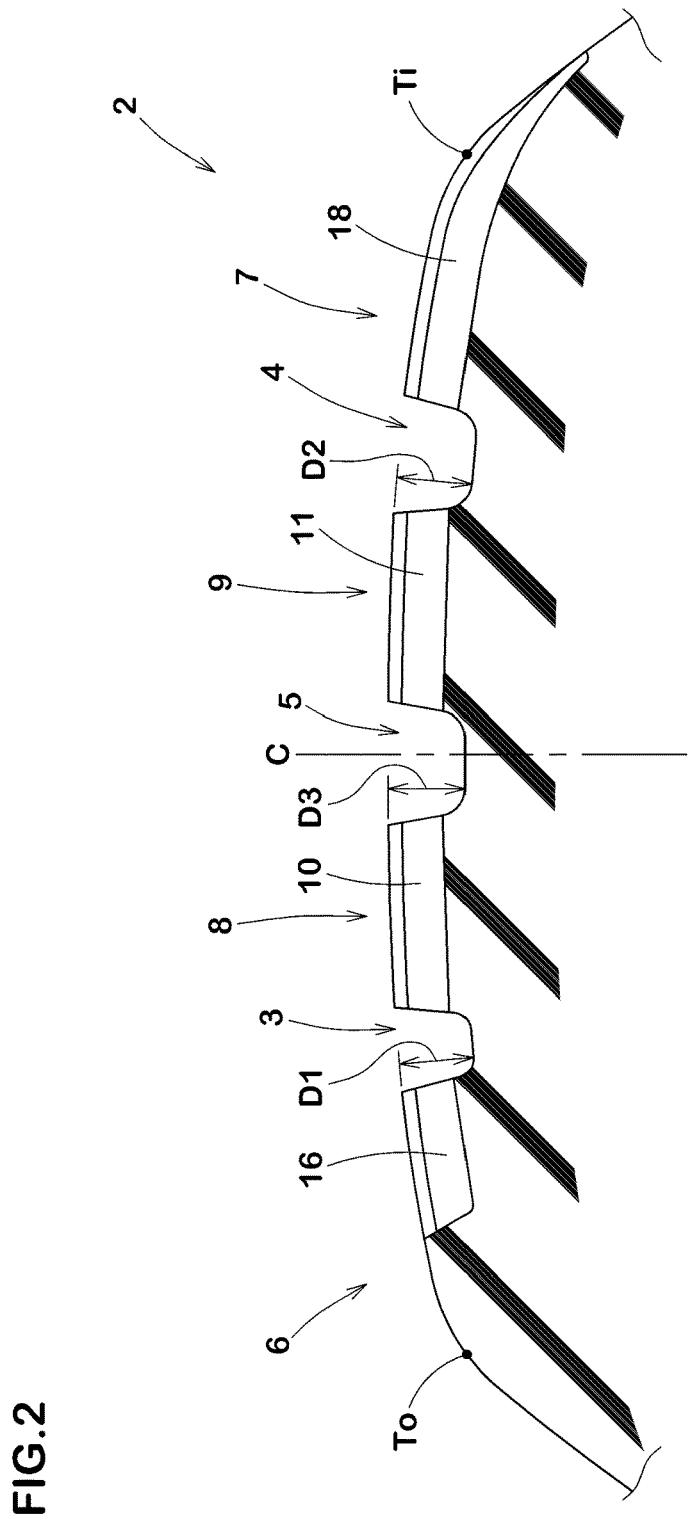
FIG. 2 is a cross-sectional view of the tread portion taken along a line A-A of FIG. 1.

FIG. 2 illustrates a cross-sectional view of the tread portion 2 taken along a line A-A of FIG. 1. As illustrated in FIG. 2, the first shoulder main groove 3, the second shoulder main groove 4, and the crown main groove 5 have depths D1, D2 and D3, respectively. These depths may be determined according to custom of tire tread art, for example. In this embodiment directed to a passenger vehicle tire, each of the depths D1 to D3 may preferably be in a range of from 5 to 10 mm in order to maintain sufficient drainage performance while ensuring steering stability.

As illustrated in FIG. 1, the land portions include an outboard shoulder portion 6 disposed between the first shoulder main groove 3 and the outboard tread edge To, an inboard shoulder portion 7 disposed between the second shoulder main groove 4 and the inboard tread edge Ti, a first crown portion 8 disposed between the crown main groove 5 and the first shoulder main groove 3, and a second crown portion 9 disposed between the crown main groove 5 and the second shoulder main groove 4.

As used herein, the tread edges To and Ti refer to axially outermost edges of the ground contacting patch of the tread portion 2 which occurs under a normally inflated loaded condition when the camber angle of the tire is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

In case of passenger vehicle tires, however, the standard pressure and standard tire load are uniformly defined by 180 kPa and 88% of the maximum tire load, respectively.

The tread width TW is defined as the width measured under a normally inflated unloaded condition, as the axial distance between tread edges Ti and To. The normally inflated unloaded condition is such that the tire 1 is mounted on the standard wheel rim with the standard pressure but is loaded with no tire load. In this application including specification and claims, various dimensions, positions and the like of the tire refer to those under the normally inflated unloaded condition of the tire unless otherwise noted.

Figure 3:
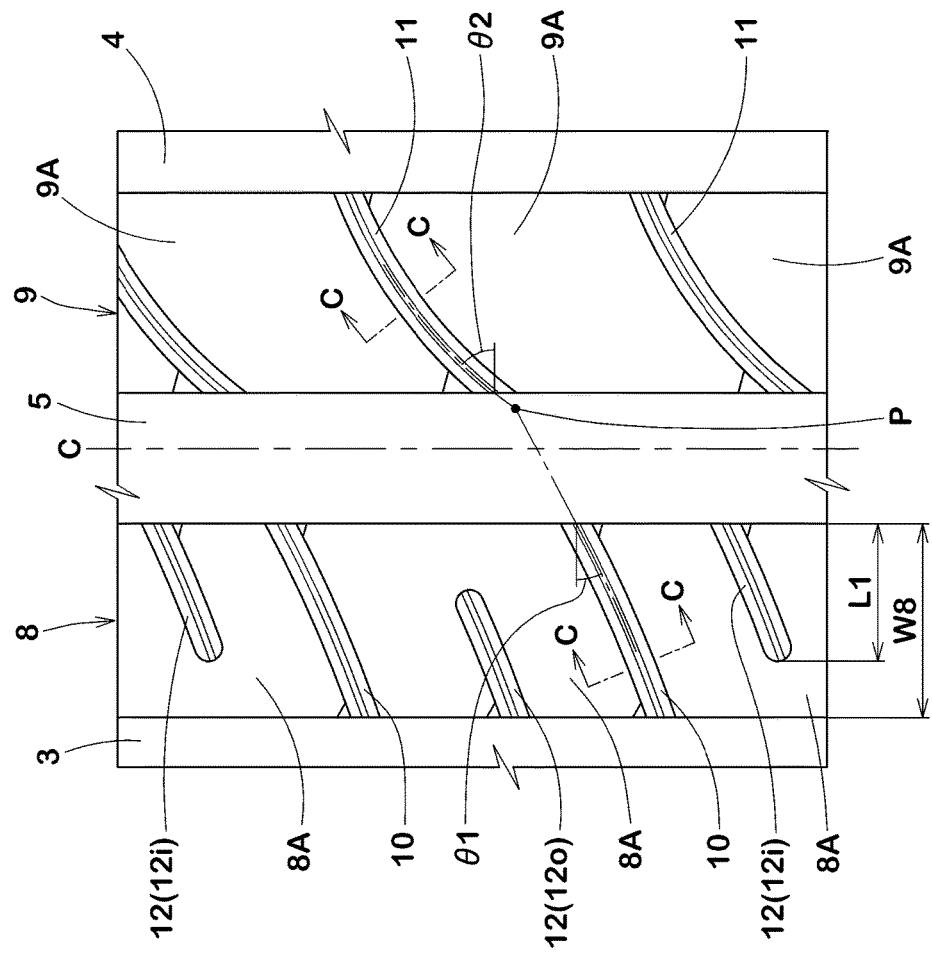
FIG. 3 is an enlarged view of a first crown portion and a second crown portion of the tread portion.

FIG. 3 illustrates an enlarged view of the first crown portion 8 and the second crown portion 9 of the tread portion 2. As illustrated in FIG. 3, each of the first crown portion 8 and the second crown portion 9 is not provided with any grooves having a width equal to or more than 2 mm. Since the respective first crown portion 8 and second crown portion 9, which are subjected to a large ground contact pressure, may maintain sufficient rigidity, excellent steering stability can be obtained.

The first crown portion 8 is provided with a plurality of first crown sipes 10. The second crown portion 9 is provided with a plurality of second crown sipes 11. These sipes 10 and 11 may optimize rigidity of the respective first crown portion 8 and second crown portion 9, and therefore ride comfort can be improved while ensuring steering stability on dry road.

Figure 4:
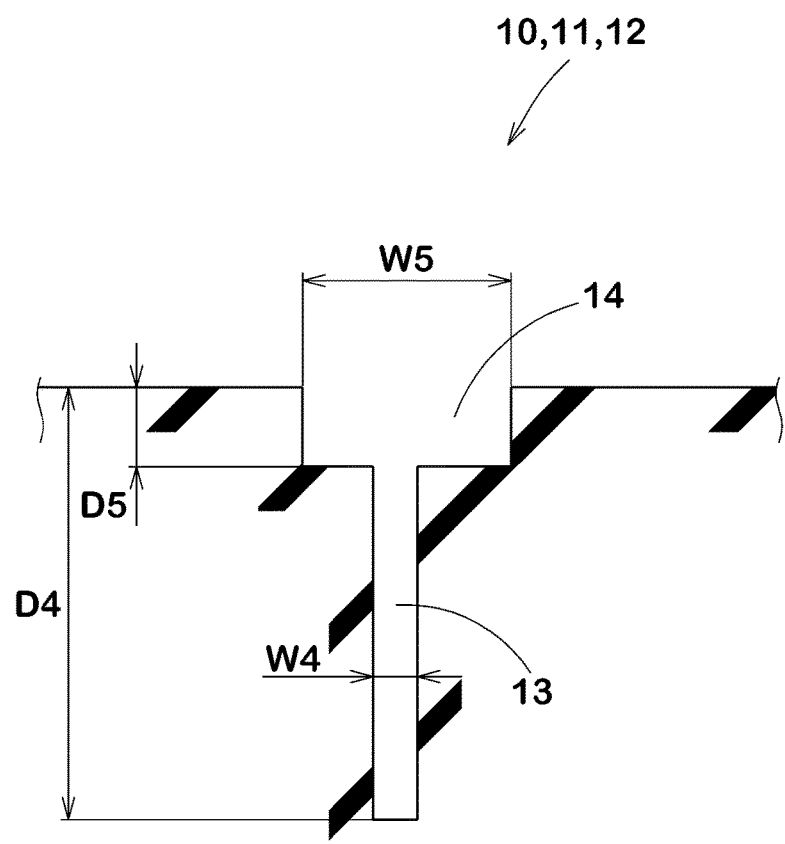
FIG. 4 is a cross-sectional view taken along lines C-C of FIG. 3.

FIG. 4 illustrates a cross-sectional view taken along lines C-C of FIG. 3. As illustrated in FIG. 4, each of the crown sipes 10 and 11 includes a sipe main body 13 and a chamfered portion 14.

Preferably, the sipe main body 13 has a width W4 in a range of less than 1 mm. The sipe main body 13 may close itself easily to increase apparent rigidity of the respective crown portions 8 and 9 by force received from the crown portions 8 and 9 when the sipe 10 or 11 comes into contact with the road.

Preferably, the depth D4 from a ground contact face to the bottom of the sipe main body 13 is in a range of from 50% to 90% the depth D3 of the crown main groove 5 (shown in FIG. 2). When the depth D4 is less than 50% the depth D3 of the crown main groove 5, ride comfort tends to deteriorate owing to excessive rigidity of the respective crown portions 8 and 9. When the depth D4 is more than 90% the depth D3 of the crown main groove 5, steering stability on dry road tends to deteriorate owing to low rigidity of the respective crown portions 8 and 9.

The chamfered portion 14 is formed radially outward of the sipe main body 13. In this embodiment, the chamfered portion 14 is a portion that the width of the sipe main body 13 is expanded on both sides in a width direction of the sipe. Preferably, the chamfered portion 14 has the width W5 in a range of more than 1 mm, but less than 2 mm. Preferably, the chamfered portion 14 has the depth D5 in a range of from 0.5 to 2.0 mm. Such a chamfered portion 14 may be useful to increase ground contact pressure of the respective crown portions 8 and 9 by decreasing net ground contact area of the respective crown portions 8 and 9. Accordingly, drainage feature of the respective crown portions 8 and 9 may be improved, and in particular, steering stability at high speed on wet road may be improved.

Preferably, the chamfered portion 14 is provided on the entire length of the respective crown sipes 10 and 11. More preferably, the chamfered portion 14 has a rectangular cross section having a sharp internal corner on both sides of the sipe main body 13, as illustrated in FIG. 4. This configuration of the chamfered portion 14 can offer not only a large void to evacuate water but also stepped sipe edges which may come into contact with the road to offer edge effect wherein one is between the ground contact face and the chamfered portion 14, and the other one is between the chamfered portion 14 and the sipe main body 13.

As illustrated in FIG. 3, each of the first crown sipes 10 extends from the crown main groove 5 to the first shoulder main groove 3. Thus, the first crown portion 8 is separated into a plurality of first crown blocks 8A by the first crown sipes 10. The first crown sipes 10 may offer edge effect in a wide area to improve steering stability on wet road.

Each of the second crown sipes 11 extends from the crown main groove 5 to the second shoulder main groove 4. Thus, the second crown portion 9 is separated into a plurality of second crown blocks 9A by the second crown sipes 11. The second crown sipes 11 may also offer edge effect in a wide area to improve steering stability on wet road.

Each of the first crown sipes 10 is inclined in a first inclination direction with respect to the axial direction, and each of the second crown sipes 11 is inclined in the same direction as the first crown sipes 10. These sipes 10 and 11 may close by receiving a side force when cornering and therefore a pair of circumferentially adjacent crown blocks 8A or 9A support one another so as to enhance lateral rigidity of the tread portion 2. Since the first crown portion 8 and the second crown portion 9 may exhibit high deformation resistance against side force when cornering, excellent steering stability on dry road as well as on wet road can be obtained, accordingly.

Preferably, the extended groove centerline of the first crown sipe 10 intersects with the extended groove centerline of the second crown sipe 11 at a point P within the crown main groove 5 in a pair of axially adjacent crown sipes 10 and 11. In other words, the first crown sipe 10 and the second crown sipe 11 are preferably arranged in a manner that the first crown sipe 10 is smoothly continued to one of the second crown sipes 11 through the crown main groove 5. Since the first crown sipe 10 and the second crown sipe 11 are inclined in the same direction and smoothly continued, there is no or very small overlap region in which the first crown sipe 10 and the second crown sipe 11 are overlapped one another on the tire equatorial plane. Accordingly, localized rigidity reduction of the respective crown portions 8 and 9 may be prevented.

Preferably, each of the first crown sipes 10 extends in an arc shape that protrudes a first circumferential direction, and each of the second crown sipes 11 extends in an arc shape that protrudes a second circumferential direction reverse to the first circumferential direction. The tire 1 having improved crown sipes 10 and 11 can improve steering stability regardless of the rotational direction. Alternatively, the crown sipes may extend in another curve manner such as S-shape and the like, or may extend in a straight manner.

In this embodiment, the angle θ2 of second crown sipe 11 with respect to the axial direction of the tire at its axially inner end is greater than the angle θ1 of the axially inner end of the first crown sipe 10. This configuration may further improve drainage performance owing to chamfered portion 14 of the second crown sipe 11.

In this embodiment, the first crown portion 8 is further provided with a third crown sipe 12 between a pair of circumferentially adjacent first crown sipes 10 and 10, wherein the third crown sipe 12 includes at least one end terminating within the first crown portion 8. The third crown sipe 12, for example, is inclined in the first inclination direction with respect to an axial direction of the tire. Namely, the third crown sipe 12 is inclined in the same direction to the first crown sipes 10. Preferably, each of third crown sipes 12 has a cross section same as those of the first crown sipes 10 and the second crown sipes 11. Preferably, the third crown sipe 12 has the axial length L1 in a range of from 40% to 70% the width W8 of the first crown portion 8 to optimize rigidity of the first crown portion 8 in order to further improve steering stability on dry road.

The third crown sipe 12, for example, includes an outer third crown sipe 12o connected to the first shoulder main groove 3, and an inner third crown sipe 12i connected to the crown main groove 5, and the outer third crown sipe 12o and the inner third crown sipe 12i are alternately arranged in the circumferential direction of the tire. This configuration may optimize rigidity of the first crown portion 8 in a well balanced manner.

As illustrated in FIG. 1, the outboard shoulder portion 6 is provided with a plurality of outboard shoulder lug grooves 15 and a planarity of outboard shoulder sipes 16, and which are alternately arranged in the circumferential direction of the tire.

Each of the outboard shoulder lug grooves 15 extends axially inwardly from the outboard tread edge To and terminates within the outboard shoulder portion 6. Preferably, the outboard shoulder lug groove 15 has the width W6 in a range of from 35% to 50% the width W3 of the crown main groove 5. Since each of the outboard shoulder lug grooves 15 is not connected to the first shoulder main groove 3, noise performance may be ensured by preventing air flowing from the first shoulder main groove 3 to the outboard shoulder lug groove 15. Furthermore, since the outboard shoulder portion 6 is formed as a lib that extends continuously in the circumferential direction of the tire, rigidity of the outboard shoulder portion 6 may be enhanced to improve steering stability on dry road.

Figure 5:
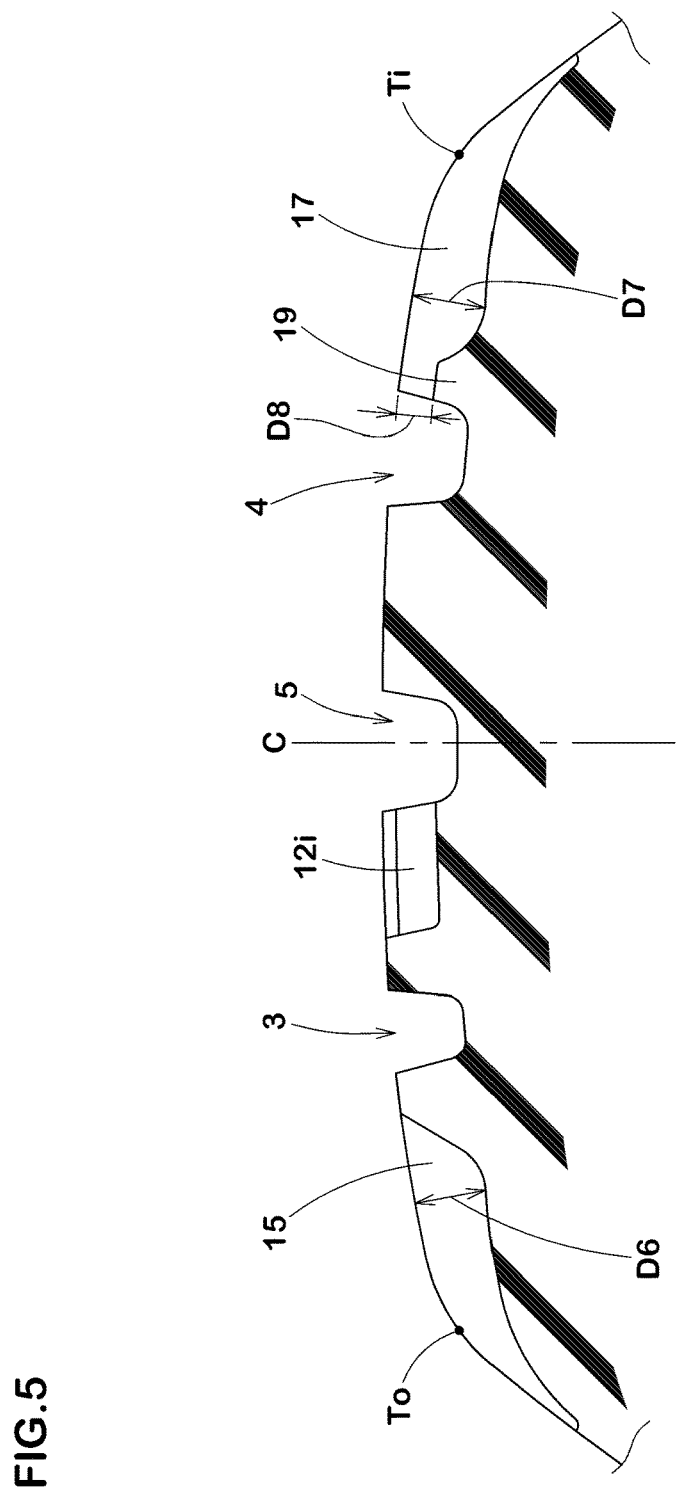
FIG. 5 is a cross-sectional view taken along a line B-B of FIG. 1.

FIG. 5 illustrates a cross-sectional view of the tread portion 2 taken along a line B-B of FIG. 1. As illustrated in FIG. 5, the outboard shoulder lug groove 15 preferably has the depth D6 in a range of equal to or less than 100% the depth D1 (illustrated in FIG. 2) of the first shoulder main groove 3. Such an outboard shoulder lug groove 15 may further improve steering stability on wet road by improving drainage performance.

As illustrated in FIG. 1, each outboard shoulder sipe 16 extends axially outwardly from the first shoulder main groove 3, and terminated within the outboard shoulder portion 6. Preferably, the outboard shoulder sipe 16 has the same cross section as the crown sipes 10 to 12. Preferably, the outboard shoulder sipe 16 has the axial length L2 in a range of from 40% to 70% the axial width W9 of the outboard shoulder portion 6 to optimize rigidity of the outboard shoulder portion 6 in order to improve ride comfort.

Preferably, each of the outboard shoulder sipes 16 is arranged in a manner that each outboard shoulder sipe 16 is smoothly continued to each the first crown sipe 10 through the first shoulder main groove 3. Since the outboard shoulder sipe 16 and the first crown sipe 10 are inclined in the same direction and smoothly continued, there is no or very small overlap region in which the outboard shoulder sipe 16 and the first crown sipe 10 are overlapped in the axial direction. Accordingly, rigidity of the outboard shoulder portion 6 and the first crown portion 8 are totally optimized.

The inboard shoulder portion 7 is provided with a plurality of inboard shoulder lug grooves 17 and a plurality of inboard shoulder sipes 18, and which are alternately in the circumferential direction of the tire.

The inboard shoulder lug groove 17 extends from the inboard tread edge Ti to the second shoulder main groove 4. Preferably, the inboard shoulder lug groove 17 has the width W7 in a range of from 35% to 50% the width W3 of the crown main groove 5. The inboard shoulder lug grooves 17 may improve drainage performance on the inboard shoulder portion 7, thereby improving steering stability on wet road.

As illustrated in FIG. 5, each of the inboard shoulder lug grooves 17 preferably has the depth D7 equal to or less than the depth D2 (illustrated in FIG. 2) of the second shoulder main groove 4, for example. In this embodiment, each of the inboard shoulder lug grooves 17 is provided with a tie-bar 19. Preferably, the tie-bar 19 has a depth D8 in a range of from 50% to 60% the depth D7 of the inboard shoulder lug groove 17. These inboard shoulder lug grooves 17 having tie-bars 19 may improve steering stability on dry road while ensuring drainage performance.

As illustrated in FIG. 1, each of the inboard shoulder sipes 18 extends from the second shoulder main groove 4 to the inboard tread edge Ti. preferably, the inboard shoulder sipe 18 has the same cross section as the crown sipes 10 to 12. Preferably, the inboard shoulder sipe 18 may have the axial length L3 in a range of not less than 130% of the axial width W10 of the inboard shoulder portion 7 to improve steering stability on wet road. The inboard shoulder sipes 18 may be useful to optimize rigidity of the inboard shoulder portion 7 to improve ride comfort.

Preferably, each of the inboard shoulder sipes 18 is arranged in a manner that each of the inboard shoulder sipes 18 is smoothly continued to each second crown sipe 11 through the second shoulder main groove 4. Since the inboard shoulder sipe 18 and the second crown sipe 11 are inclined in the same direction and smoothly continued, there is no or very small overlap region in which the inboard shoulder sipe 18 and the second crown sipe 11 are overlapped in the axial direction. Accordingly, rigidity of the inboard shoulder portion 7 and the second crown portion 9 are totally optimized.

While the particularly preferable embodiments in accordance with the present invention have been described in detail, the present invention is not limited to the illustrated embodiments, but can be modified and carried out in various aspects.

EXAMPLE

Pneumatic tires having a size 175/65R14 and a basic tread pattern illustrated in FIG. 1 were manufactured based on details shown in Table 1. Then, drainage performance, steering stability on dry road, and noise performance were tested. The common specifications of tires and test procedures are as follows.

Drainage Performance Test:

Each test tire was installed to a passenger vehicle using a 14×5J rim, and then the vehicle was made to run on a wet asphalt test course to measure the maximum lateral acceleration during cornering (lateral hydroplaning resistance performance). The test results are indicated in Table 1 using an index based on Ref. 1 being 100. The larger the value, the better the drainage performance is.

Steering Stability Test:

The above mentioned vehicle was made to run on a dry asphalt test course to evaluate its steering feeling, response and grip by the driver's feeling. The test results are shown in Table 1 using a score based on Ref. 1 being 100. The larger the value, the better the steering stability is.

Noise Performance Test:

The above mentioned vehicle was made to run on a road noise measurement course with a rough asphalt paved surface at a speed of 60 km/hr, and internal vehicle noise was picked up through a microphone installed near the driver's ear on the window side, and then a sound pressure level of overall db(A) was measured. The test results are indicated with an index of 100 representing a value in Ref. 1. The larger the value, the better the performance is.

Test results are shown in Table 1. From the test results, it was confirmed that Example tires in accordance with the present embodiment can be effectively improved drainage performance and steering stability while ensuring noise performance.

TABLE 1

|  | Re. 1 | Ref. 2 | Ex. 1 | Ex. 2 | Ex. 3 | Ex. 4 |
|---|---|---|---|---|---|---|
| Tread pattern | Symmetry | Asymmetry | Asymmetry | Asymmetry | Asymmetry | Asymmetry |
| Crown lug groove having a width equal to or more then 2 mm | Presence | Presence | None | None | None | None |
| Crown sipe having a width less than 2 mm | Presence | None | Presence | Presence | Presence | Presence |
| Chamfered portion on crown sipe | None | None | Presence | Presence | Presence | None |
| Ratio of total main groove width to tread width (%) | 24 | 27 | 27 | 25 | 29 | 27 |
| Drainage performance (Index) | 100 | 145 | 150 | 145 | 155 | 140 |
| Steering stability (Score) | 100 | 110 | 120 | 125 | 115 | 120 |
| Noise performance (Index) | 100 | 110 | 110 | 110 | 110 | 110 |

What is claimed is:

1. A pneumatic tire comprising:
a tread portion having a pair of tread edges and being provided with only three continuously extending circumferential grooves to separate a plurality of land portions, wherein the tread portion comprises a designated install direction to a vehicle such that the tread edges comprise an outboard tread edge and an inboard tread edge;
the circumferential grooves consisting of a first shoulder main groove, a second shoulder main groove and a crown main groove disposed between the first shoulder main groove and the second shoulder main groove;
the land portions comprising a pair of shoulder portions each extending to the tread edges and disposed axially outward of each of the first and second shoulder main grooves, a first crown portion forming an entire region between the crown main groove and the first shoulder main groove, and a second crown portion forming an entire region between the crown main groove and the second shoulder main groove, wherein the first crown portion is disposed on the outboard tread edge side and the second crown portion is disposed on the inboard tread edge side;
the first crown portion being provided with a plurality of first crown sipes having a width of less than 2 mm, but the first crown portion being not provided with any grooves having a width equal to or more than 2 mm;
the second crown portion being provided with a plurality of second crown sipes having a width of less than 2 mm, but the second crown portion being not provided with any grooves having a width equal to or more than 2 mm;
each of the first crown sipes extending from the crown main groove to the first shoulder main groove with a first inclination direction with respect to an axial direction of the tire; and
each of the second crown sipes extending from the crown main groove to the second shoulder main groove with the first inclination direction with respect to an axial direction of the tire, wherein
each of the first crown sipes and the second crown sipes extend in a curved shape, and each of the first crown sipes has a radius of curvature that is greater than the radius of curvature of each of the second crown sipes.

2. The pneumatic tire according to claim 1, wherein each of the plurality of first crown sipes is smoothly continued to each of the plurality of second crown sipes through the crown main groove such that an extended grooves centerline of the first crown sipe intersects with an extended groove centerline of the second crown sipe at a point within the crown main groove.

3. The pneumatic tire according to claim 1, wherein each of the first crown sipes and the second crown sipes comprises a chamfered portion provided on its radially outer portion.

4. The pneumatic tire according to claim 1, wherein a total of widths of the main grooves is in a range of from 25% to 29% of a tread width.

5. The pneumatic tire according to claim 1, wherein each of the first crown sipes extends in an arc shape that protrudes a first circumferential direction, and each of the second crown sipes extends in an arc shape that protrudes a second circumferential direction reverse to the first circumferential direction.

6. The pneumatic tire according to claim 1, wherein the the first crown portion is further provided with a third crown sipe disposed between a pair of circumferentially adjacent first crown sipes, wherein the third crown sipe comprises at least one end terminating within the first crown portion.

7. The pneumatic tire according to claim 6, wherein the third crown sipe comprises an outer third crown sipe connected to the first shoulder main groove, and an inner third crown sipe connected to the crown main groove, and the outer third crown sipe and the inner third crown sipe are alternately arranged in a circumferential direction of the tire.

8. The pneumatic tire according to claim 7, wherein each of the third crown sipes is inclined in the first inclination direction with respect to an axial direction of the tire.

9. The pneumatic tire according to claim 6, wherein the third crown sipe is inclined in the first inclination direction with respect to an axial direction of the tire.

10. The pneumatic tire according to claim 6, wherein the third crown sipe has an axial length L1 which is more than 50% but not more than 70% of an axial width of the first crown portion.

11. The pneumatic tire according to claim 6, wherein the first crown portion is provided with only the plurality of first crown sipes and the third crown sipe.

12. The pneumatic tire according to claim 11, wherein the second crown portion is provided with only the plurality of second crown sipes.

13. The pneumatic tire according to claim 1, wherein
each of the first crown sipes and the second crown sipes comprises a sipe main body and a chamfered portion located radially outward of the sipe main body,
the sipe main body has a width in a range of less than 1 mm, and
the chamfered portion is a portion that is expanded on both sides in a width direction of the sipe main body and that has a width in a range of more than 1 mm but less than 2 mm.

14. The pneumatic tire according to claim 13, wherein the chamfered portion has a rectangular cross section having a sharp internal corner on both sides of the sipe main body.

15. The pneumatic tire according to claim 1, wherein the second crown portion is provided with only the plurality of second crown sipes.

* * * * *